US010075596B2

(12) United States Patent
Chakraborty et al.

(10) Patent No.: US 10,075,596 B2
(45) Date of Patent: Sep. 11, 2018

(54) METHOD AND APPARATUS FOR SHARING A SERVICE IN A WIRELESS NETWORK

(75) Inventors: Soumyajit Chakraborty, Harrison, NJ (US); James Gordon Beattie, Jr., Bergenfield, NJ (US); Stephen J. Griesmer, Westfield, NJ (US); Shiv Kumar, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1151 days.

(21) Appl. No.: 13/486,959

(22) Filed: Jun. 1, 2012

(65) Prior Publication Data

US 2013/0325700 A1    Dec. 5, 2013

(51) Int. Cl.
*H04M 15/00* (2006.01)
*H04W 12/08* (2009.01)
*G06F 21/44* (2013.01)
*G06Q 50/32* (2012.01)

(52) U.S. Cl.
CPC ...... *H04M 15/7652* (2013.01); *G06F 21/445* (2013.01); *G06Q 50/32* (2013.01); *H04M 15/765* (2013.01); *H04W 12/08* (2013.01)

(58) Field of Classification Search
USPC ................................................. 455/405, 406
See application file for complete search history.

(56) References Cited

U.S. PATENT DOCUMENTS

| | | | | |
|---|---|---|---|---|
| 6,061,790 A * | 5/2000 | Bodnar | ................. | G06F 21/445 380/282 |
| 6,618,789 B1 * | 9/2003 | Okaue | ..................... | G06F 21/79 707/E17.01 |
| 7,957,720 B2 * | 6/2011 | Mumford | .............. | H04M 15/00 379/114.01 |
| 8,032,182 B2 * | 10/2011 | Bennett | .................. | H04W 12/06 455/558 |
| 8,055,237 B2 * | 11/2011 | Jones | ................. | G06Q 30/0251 379/111 |
| 8,214,487 B2 * | 7/2012 | Savoor | ................... | G06Q 50/06 370/252 |
| 8,355,487 B2 * | 1/2013 | Cai | ......................... | H04L 12/14 379/114.17 |
| 8,443,082 B2 * | 5/2013 | Nguyen | ............. | H04L 61/2575 709/225 |
| 8,472,598 B2 * | 6/2013 | Mock | .................. | H04M 15/785 379/114.16 |

(Continued)

*Primary Examiner* — Mamon A Obeid

(57) ABSTRACT

A method and apparatus for sharing a service in a wireless network are disclosed. For example, the method receives a request for sharing a service from a first user endpoint device associated with a first customer, wherein the request is directed to a second user endpoint device associated with a second customer, performs an authentication of the first user endpoint device, determines whether the first user endpoint device has a subscription to a sharing service, determines whether the second user endpoint device has a subscription to the sharing service, attempts to obtain an authorization to enable the first user endpoint device to access the service that is associated with the second user endpoint device, wherein the service is related to a financial transaction privilege and provides a response granting the request for the sharing of the service, if the authorization is received.

20 Claims, 3 Drawing Sheets

(56) References Cited

U.S. PATENT DOCUMENTS

| | | | | |
|---|---|---|---|---|
| 8,577,329 B2* | 11/2013 | Momtahan | H04L 12/14 | 379/114.03 |
| 8,706,863 B2* | 4/2014 | Fadell | H04M 15/00 | 370/395.2 |
| 8,787,966 B2* | 7/2014 | Altman | H04W 8/08 | 370/328 |
| 8,838,069 B2* | 9/2014 | Chakraborty | H04M 3/42238 | 455/411 |
| 8,984,645 B2* | 3/2015 | Yan | G06F 21/10 | 726/26 |
| 9,781,603 B1* | 10/2017 | Nenov | H04W 12/08 | |
| 2002/0013831 A1* | 1/2002 | Astala | H04L 63/08 | 709/220 |
| 2005/0096010 A1* | 5/2005 | Benco | H04M 3/42263 | 455/406 |
| 2006/0059194 A1* | 3/2006 | Oh | G06F 21/445 | |
| 2007/0083750 A1* | 4/2007 | Miura | G06F 21/445 | 713/155 |
| 2008/0086424 A1* | 4/2008 | Jambunathan | G06Q 20/10 | 705/67 |
| 2008/0096524 A1* | 4/2008 | True | H04L 12/1457 | 455/406 |
| 2008/0130849 A1* | 6/2008 | Mock | H04M 15/785 | 379/114.01 |
| 2008/0168541 A1* | 7/2008 | Thompson | H04L 63/102 | 726/5 |
| 2009/0089593 A1* | 4/2009 | Kuno | G06F 21/445 | 713/193 |
| 2010/0093342 A1* | 4/2010 | Ramachandra Rao | H04M 15/00 | 455/432.1 |
| 2010/0197272 A1* | 8/2010 | Karaoguz | H04L 63/0815 | 455/411 |
| 2010/0235881 A1* | 9/2010 | Liu | G06F 21/6218 | 726/3 |
| 2010/0273424 A1* | 10/2010 | De Petris | H04L 63/10 | 455/41.2 |
| 2011/0151835 A1* | 6/2011 | Velusamy | H04L 63/0861 | 455/411 |
| 2012/0089484 A1* | 4/2012 | Kumar | G06Q 20/102 | 705/26.61 |
| 2012/0149328 A1* | 6/2012 | Chakraborty | H04M 3/42238 | 455/411 |
| 2012/0278466 A1* | 11/2012 | Jallapelli | H04L 12/6418 | 709/223 |
| 2013/0054634 A1* | 2/2013 | Chakraborty | H04L 67/1091 | 707/769 |
| 2013/0283182 A1* | 10/2013 | Dadu | H04L 67/125 | 715/740 |
| 2013/0322648 A1* | 12/2013 | Chukka | H04L 65/60 | 381/77 |
| 2013/0325700 A1* | 12/2013 | Chakraborty | H04W 12/08 | 705/39 |
| 2014/0059608 A1* | 2/2014 | Beattie, Jr. | H04N 21/45 | 725/39 |
| 2014/0068790 A1* | 3/2014 | Chakraborty | H04L 9/3231 | 726/30 |
| 2014/0169634 A1* | 6/2014 | Prakash | G06K 9/00791 | 382/105 |
| 2014/0188719 A1* | 7/2014 | Poornachandran | G06Q 20/36 | 705/41 |
| 2014/0220937 A1* | 8/2014 | Kang | H04W 12/06 | 455/411 |
| 2014/0289872 A1* | 9/2014 | Mun | G06F 21/6245 | 726/30 |
| 2016/0065546 A1* | 3/2016 | Krishna | G06F 17/2235 | 726/30 |
| 2016/0066355 A1* | 3/2016 | Chakraborty | H04W 4/21 | 726/3 |
| 2016/0192196 A1* | 6/2016 | Ranade | H04L 63/062 | 726/3 |
| 2017/0109519 A1* | 4/2017 | Sugaya | G06F 21/44 | |
| 2017/0118165 A1* | 4/2017 | Kumar | H04L 51/36 | |
| 2018/0115901 A1* | 4/2018 | Nenov | H04W 12/08 | |

* cited by examiner

METHOD AND APPARATUS FOR SHARING A SERVICE IN A WIRELESS NETWORK

The present disclosure relates generally to communication networks and, more particularly, to a method and apparatus for sharing a service in a wireless network, e.g., a service in a long term evolution (LTE) based wireless network.

BACKGROUND

As Internet usage continues to grow, more and more customers are accessing communications services via a mobile device, e.g., a cell phone, a smart phone, etc. For example, a customer may receive multimedia content via his/her cell phone. The cell phone transmits and receives voice and data packets to and from the service provider's network via a base station and an access network.

A customer has an option to subscribe to specific types of services provided by the service provider's network. However, depending on how often a particular service is accessed by a customer, subscribing to a particular service may not be cost effective. Consequently, family plans have gained popularity. For example, family plans may offer shared minutes and bandwidth that members of a family can share. However, the sharing of minutes and services is limited to members of a family.

SUMMARY OF THE DISCLOSURE

In one embodiment, the present disclosure teaches a method and apparatus for sharing a service in a wireless network. For example, the method receives a request for sharing a service from a first user endpoint device associated with a first customer, wherein the request is directed to a second user endpoint device associated with a second customer, performs an authentication of the first user endpoint device, determines whether the first user endpoint device has a subscription to a sharing service, if the first user endpoint device is successfully authenticated, determines whether the second user endpoint device has a subscription to the sharing service, attempts to obtain an authorization to enable the first user endpoint device to access the service that is associated with the second user endpoint device, if both the first user endpoint device and the second user endpoint device have a subscription to the sharing service, wherein the service is related to a financial transaction privilege and provides a response granting the request for the sharing of the service, if the authorization is received.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for sharing a network service, e.g., in a long term evolution (LTE) based wireless network and the like. Although the teachings of the present disclosure are discussed below in the context of an LTE network, the teaching is not so limited. Namely, the teachings of the present disclosure can be applied for other types of wireless networks or cellular networks (e.g., 2G network, 3G network, or other evolving wireless networks and the like), wherein sharing of services is beneficial.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance to the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. For the 4G network, a radio base transceiver station (RBS), as per the 3GPP standards, is referred to as an eNodeB (or simply as a base station). An eNodeB provides an LTE—air interface and performs radio resource management for wireless access.

In one embodiment, a Serving GPRS Support Node (SGSN) refers to a network node responsible for communicating with user endpoint devices and routing of data calls. For example, the SGSN may send and receive data packets to and from user endpoint devices in the coverage area of the SGSN.

In one embodiment, a Gateway GPRS Support Node (GGSN) refers to a network node responsible for the interworking between the GPRS network and external packet switched networks, e.g., the Internet. The GGSN converts the GPRS packets coming from the SGSN into the packet data protocol (PDP) format of the external packet network. For example, the GPRS packet may be converted to an internet protocol packet prior to being sent to the external network, which is internet protocol based.

Figure 1:
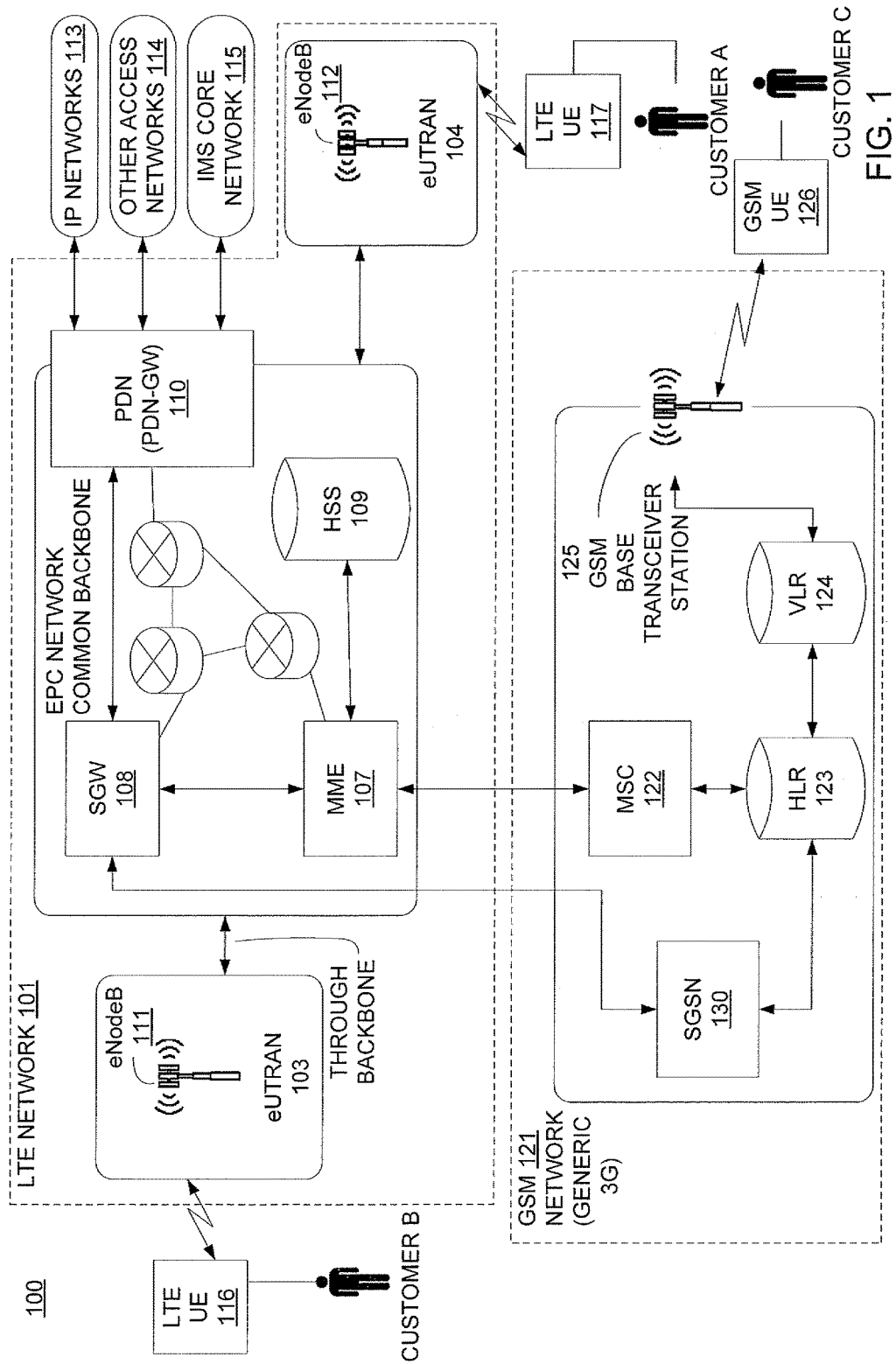
FIG. 1 is a block diagram depicting an illustrative network related to the current disclosure.

FIG. 1 illustrates an exemplary network 100 related to the present disclosure. In one illustrative embodiment, the network 100 comprises an LTE network 101, a GSM network 121, an IP network 113, other access networks 114, an IP Multimedia Subsystem (IMS) core network 115, LTE user endpoint devices 116 and 117, and a GSM user endpoint device 126.

The user endpoint devices 116, 117 and 126 can be a smart phone, a cellular phone, a computer or laptop, a computing tablet, or any endpoint communication devices equipped with wireless capabilities.

In one embodiment, the LTE network 101 comprises access networks 103 and 104 and a core network 105. In one example, each of the access networks 103 and 104 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRANs 103 and 104 are in communication with the EPC network 105. In operation, LTE user equipment or user endpoints (UE) 116 may access wireless services via the eNodeB 111 located in the eUTRAN 103. Similarly, the LTE UE 117 may access wireless services via the eNodeB 112 located in the eUTRAN 104.

It should be noted that any number of eNodeBs can be deployed in an eUTRAN. In one illustrative example, the eUTRANs 103 and 104 may comprise one or more eNodeBs.

An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In EPC network 105, network devices Mobility Management Entity (MME) 107 and Serving Gateway (SGW) 108 support various functions as part of the LTE network 100. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a Public Data Network (PDN) gateway (GW) 110 which serves as a gateway that provides access between the EPC network 105 and various data networks, e.g., other IP networks 113, an IMS core network 115, other access networks 114 and the like. In one embodiment, the EPC network 105 may also comprise a Policy Charging and Rule Function (PCRF) that supports accesses to subscriber databases and specialized functions of a charging system. The Policy Charging and Rule Function (PCRF) can be implemented as a standalone module or implemented as a part of one of the other network modules of the EPC network 105. It should be noted that the EPC network 105 as shown in FIG. 1 is only illustrative and is not limited to the network elements as described above, i.e., there could be additional network elements that are deployed but not discussed.

In one embodiment, the GSM network 121 comprises a mobile switching center (MSC) 122, a home location register (HLR) 123, a visitor location register (VLR) 124, a GSM network base transceiver station 125. The GSM user endpoint device 126 accesses a wireless service via the GSM base transceiver station 125, which is located in GSM network 121.

In one embodiment, an MSC refers to a network node that is responsible for communicating with user endpoint devices, routing voice calls and providing other services. For example, the MSC may setup and release end-to-end connections and perform handover during a call to handle mobility of user endpoint devices.

In one embodiment, a gateway mobile switching center ((GMSC), not shown) refers to a network node that determines which mobile switching center is currently being visited by a called party.

Network services that a user subscribes to are maintained in a subscriber profile. In a 2G network, the subscriber profile is referenced by a home location register.

It should be noted that although various networks are shown as separate networks in FIG. 1, it is possible that functions performed by these networks can be combined into fewer networks or expanded into a greater number of networks depending on the deployment requirements.

It should also be noted that the above illustrated network 100 is only illustrative and the number of network components or elements are not specifically limited as shown. Any number of network components or elements can be deployed.

In one embodiment, a network service provider may enable customers to share services via a sharing service. Each customer has an option to subscribe to specific types of services. However, occasionally, a customer may wish to be able to use a service to which the customer did not subscribe. For example, the customer may wish to borrow a service from another customer. The customer may then subscribe to a sharing service such that the customer can have access to a service to which another customer has previously subscribed. The other customer may then lend minutes, access to a specific service, e.g., a Voice over IP service, a data plan service, an international calling plan service, a financial transaction service and so on, to the customer. For instance, customer A may be a subscriber of one or more services, e.g., an international call service, and an Internet access service. Customer B may not have subscribed to the Internet access service but may wish to access the Internet access service to which customer A has already subscribed to. In one embodiment, the service provider may then enable customer B to borrow the subscribed service from customer A.

In one embodiment, a calling party is a borrower (borrowing party) of a service and sends a request for a sharing session with a called party. If the called party agrees to the request received from the calling party, the called party is then a lending party or lender for the sharing session. A sharing session is a particular session associated with a sharing service. In order to enable the sharing of a service, both the borrower and the lender need to subscribe to the sharing service.

The service provider may provide the sharing service as an add-on feature or a completely separate service feature. For example, the service provider may provide a subscriber of Internet access service to have the ability to share the Internet access service with others who do not have such service for a limited number of instances. For example, a subscriber may be allowed to share the Internet access service for a total of 10 instances per month, for a duration of 10 hours per month irrespective of the number of instances, for friends and family members only and so on. Alternatively, the service provider may provide the sharing service for a fee, e.g., charging the subscriber an additional charge to allow the subscriber to share its subscribed service for a number of instances, for a predefined time period, for a predetermined among of usage, e.g., based on time usage or the amount of data accessed, and so on. Alternatively, the service provider may provide the sharing service where it will charge the borrower for accessing the shared service. For example, the service provider may charge the borrower for each instance of using the shared service. Alternatively, the service provider may even implement a fee sharing option with the lending party if the amount of fees collected from borrowers' access is significant, e.g., crediting a certain dollar amount to the lending party's account, reducing the charges of the lending party for the subscribed service, providing additional add-on features to the lending party and so on. The sharing service may provide exposure of the service provider's features to others who may not have access or even knowledge of such service features. It should be noted that the above examples are only illustrative, and should not be deemed as limitations of the present disclosure.

In one embodiment, the borrower and the lender subscribe to the sharing service prior to issuing a request for a sharing session. In another embodiment, the sharing service may be dynamically subscribed to on demand, e.g., on the fly. For example, a customer may subscribe to the sharing service while initiating a request for a sharing session with another customer. For instance, the customer may send a request for a sharing session and may not realize that the customer has not subscribed to such service. The service provider may then send a reply to the customer that indicates the customer is not currently a subscriber, and the customer may be offered an opportunity to immediately subscribe to the sharing service for a pre-determined fee, e.g., a per transaction fee, a monthly subscription fee and so on. The customer may then send a reply accepting or rejecting the offer. If the customer accepts the offer, the request may then be forwarded towards the lending party. In one embodiment, the borrower and the lender are customers of the same service provider. In another embodiment, the borrower and the lender are customers of different service providers, who may cooperatively offer this sharing service to both of their customers.

In one embodiment, the sharing service may be offered by the service provider as an added feature to a subscriber of another service. In one embodiment, if a fee is incurred, then a billing server will be informed of the activation of the sharing service for each instance of sharing. Alternatively, the fee may simply be a fixed monthly charge associated with the sharing feature.

In one embodiment, a customer may have an option to turn-on and to turn-off the sharing service. That is, the sharing service may be dynamically turned-on or turned-off by the customer on the fly. For example, when the customer turns the option off, the customer and/or the customer's sharable services (features) may not be visible to other customers. In one embodiment, only the services that the customer indicates as sharable at a specific time are visible to other customers. In one embodiment, the customer may be able to indicate which services are sharable with each specific customer. For instance, a customer may let some customers access all services while allowing other customers to access only specific services. In one embodiment, the customer may have a plurality of peering (sharing) groups. Members of each particular peering group may have access to a specific list of services of the customer. In one embodiment, the peering group may be established by the customer. In another embodiment, the service provider may establish the peering groups and enable customers to join peering groups based on the customer's interest and choice.

When the sharing service is being accessed, the service provider needs to authenticate the request. In order to authenticate the request, in one embodiment the requesting user endpoint device provides to the service provider an IP address, an access point and/or other parameters of the user endpoint device from which the service is to be shared. For example, an MME in the service provider's network receives the request from the user endpoint device via an eNodeB.

The MME then forwards the sharing request towards the HSS. The HSS then performs an authentication of the calling party (the borrower). For example, the user may be requested to enter a password, or any other well known form of authenticating the user's credentials.

If the user is successfully authenticated, the HSS proceeds to a determination of whether the user is a subscriber of the sharing service. The HSS contains subscription-related information (e.g., subscriber profiles). In one embodiment, the HSS also performs mapping of subscriber profiles associated with two or more subscribers having sharing capabilities. In other words, the HSS may verify a plurality subscriber profiles, if there are several borrowers who simultaneously want to share services from a single lending party, or the network service provider may require that both borrower and lender have subscribed to the sharing service before sharing will be authorized.

The HSS may then determine if the user is a subscriber of the sharing service by analyzing the subscriber profile of the user. If the subscriber profile indicates that the user does not subscribe to the sharing service, then the HSS will inform the MME, which in turn, will deny the request for accessing the sharing service.

In another embodiment, if the subscriber profile indicates that the user does not subscribe to the sharing service, the user is notified and provided with an offer to subscribe to the sharing service. In yet another embodiment, the user is notified and provided an offer to subscribe to the sharing service after verifying that the user's subscriber profile and/or user endpoint device does not restrict the user from subscribing to the sharing service. For example, a parent may restrict a child who has access to an endpoint device from subscribing to a sharing service, e.g., in terms of borrowing a service and/or lending a service. If the user accepts the offer or is already a subscriber of the sharing service, the MME proceeds to request an authorization from the called party, such that the calling party may use services of the called party (the lender).

The HSS obtains the subscriber profile of the user endpoint device to which the request is directed. If the user endpoint device to which the request is directed is not a subscriber of the sharing service, the request for the sharing session is denied. Otherwise, the MME sends an authorization request to the intended lending user endpoint device. The authorization request may also be referred to as a permission request. The MME selects the SGW associated with the lender and forwards the permission request via the SGW and the eNodeB serving the lender. For example, the authorization request may comprise information pertaining to the identity of the user endpoint device that has requested for a sharing session. In another example, the authorization request may comprise which one or more services are intended to be accessed (borrowed) from the lending user endpoint device.

The user of the endpoint device to which the request is directed may then grant or deny the request. If the request for the sharing session is granted, the MME receives an affirmative response to the request. The MME determines the current location of the user endpoint device from which the request is received, selects a serving gateway for serving the customer and forwards the request to the serving gateway that is selected. If necessary, the MME may also receive an update of the location of the requesting user endpoint device from a home location register.

In one embodiment, the serving gateway sets-up the sharing session between the borrower and the lender user endpoint devices. Depending of the shared service, the borrowing endpoint device and the lending endpoint device may communicate directly with respect to the shared service. In another embodiment, there is no sharing session that will be established between the borrower and the lender user endpoint devices, e.g., the borrower is simply allowed to use the VoIP service of the lender. In this scenario, there is no need for a sharing session to be established between the borrower and the lender. However, there will be instances where it will be beneficial to establish a sharing session between the borrower and the lender user endpoint devices as further described below.

In one embodiment, the sharing session enables the borrowing and lending user endpoint devices to share a display. For example, the users of the user endpoint devices may wish to share, a map, a set of directions, data, image, financial transaction data, etc. such that both the borrower and the lender are able to view the same content on their respective display screens.

Alternatively, the lender of the services may not wish to engage in a communication with the borrower of the service. For example, the borrower may wish to borrow a specific service, e.g., an international calling service, from the lender. However, the borrower and the lender are not planning to have an international call between the borrower and the lender. The borrower is simply borrowing the capability to make the international call such that the international call can be made to a third party. As such, after the permission is granted, the MME may release the lending user endpoint device from the communication session. It is important to note that the releasing of the lending user endpoint device does not terminate the communication session. Namely, the MME maintains the communication with the borrowing user endpoint device and processes requests to and from the borrowing user endpoint device, in accordance with the permission as given by the lender.

In one embodiment, the lender may have pre-authorized a particular user, a particular group of users, etc. to borrow one or more services. If the pre-authorization is provided, an authorization request may not be presented to the lender for each sharing session. Instead, the borrower's request is processed in accordance with the pre-authorization by the lender.

In one embodiment, the borrower and the lender are serviced by the same HSS. In another embodiment, the borrower and the lender may be serviced by different HSSs belonging to different service providers. If the borrower and the lender are served by different HSSs, the HSS of the borrower needs to interact with the HSS of the lender. If both the borrower and the lender are served by the same HSS, the HSS may access the respective service profiles to determine whether the request for the sharing service can be granted.

In one embodiment, the borrower and the lender are serviced by a same type of wireless network e.g., both parties are served by LTEs, both are served by 3G networks, etc. In another embodiment, the borrower and the lender may be serviced by different types of wireless networks, e.g., the borrower is served by an LTE network while the lender is served by a 3G network, or the borrower is served by a 3G network while the lender is served by an LTE network. If the borrower and the lender are served by different wireless networks, different network components of these different wireless networks must work together to implement the present sharing service, e.g., the MME of one wireless network will interact with the MSC of another wireless network. For example, if the borrower is served by an LTE network and the lender is served by a GSM network, the MME of the LTE and the MSC of the GSM will collectively authenticate the sharing session, in order to enable the SGW of the borrower to communicate with the SGSN of the GSM network to set-up the session for the sharing of services.

In one embodiment, the SGSN of the lender communicates with a GSM VLR to determine the current location of the user endpoint device to which the request is directed. If necessary, the GSM VLR may also obtain an update from the home location register. The SGSN then directs the request to the home location register. In order to determine whether the request is directed to a subscriber of the sharing service, the home location register obtains the subscriber profile of the user endpoint device to which the request is directed. In one example, the request may be directed to a user endpoint device that has no subscription to the sharing service. In another example, the request may be directed to a user endpoint device that has subscription to the sharing service. If the user endpoint device to which the request is directed is not a subscriber of the sharing service, the MSC denies the request. Otherwise, the MSC sends an authorization request to the intended user endpoint device. In one embodiment, the intended lender may have provided pre-authorization for borrowing of a service by a particular user, for a particular service, etc. If a pre-authorization exists, the MSC may grant the borrower's request, without sending an authorization request to the lender. The MSC keeps track of the borrowed services and provides reports as needed. For example, the MSC may report to a billing server.

In one embodiment, the sharing service may enable a customer to share financial transaction privileges with another customer. For example, a customer A may be performing a transaction that requires a financial transaction privilege that the customer does not have. The customer may then initiate a sharing session with another customer, e.g., customer B, who has access to the desired financial transaction privilege. The customer B may then allow the financial transaction privilege to be extended to the customer A. For example, a child using a first endpoint device may not have a financial transaction privilege to make a purchase. The child can initiate a sharing request to a sharing service of the child's parent, who then may grant the request on a limited basis to allow the child to access the financial transaction privileges of the parent. For example, a sharing session can be established between the endpoint devices of the child and parent and the parent is able see the product or service that is being requested by the child. For example, the child may wish to make a purchase using a credit card (or accessing a bank account) that is under the control of the parent. The parent may use the sharing session to provide the authorization to access the parent's financial transaction privilege and to see what financial transactions are being conducted, e.g., the child is traveling abroad and may need access to a bank account to make a cash withdrawal.

In one embodiment, the customer may access a financial transaction privilege via a scanning process that facilitates as a form of authentication of the borrower. For example, customer A may initiate the sharing session via a scanning of a barcode associated with the borrower's user endpoint device, e.g., scanning a card with a barcode that was issued with the borrower's user endpoint device. This allows customer B to know that the borrower's user endpoint device has not been stolen. Namely, the stealer will have to steal both the borrower's user endpoint device and the card. It should be noted that the form of authentication may also comprise scanning of a finger print, a retina scan, etc. Namely, the borrower's user endpoint device may be used to facilitate the capturing of the content used for authentication (e.g., retina scan, finger print scan, etc.). The customer B may then allow the financial transaction privilege to be extended to the customer A by clicking on a device screen once the network provider has assured customer B that the sharing request has been properly authenticated by the wireless network.

In one embodiment, the sharing service may enable a customer to transfer financial transaction privileges to another customer. For example, customer A may be performing a transaction that requires a financial transaction privilege that customer A does not have. Customer A may then initiate a sharing session with another customer, e.g., customer B, who has access to the desired financial transaction privilege. Customer B may transfer the financial transaction privilege to customer A temporarily or a limited basis (e.g., for a time period such as a day or an hour, for a total cash amount such as $500.00, for a particular location (e.g., on campus location only) and so on) or on a per transaction basis.

In one embodiment, a customer may utilize the sharing service to access services that the customer (himself or herself) normally accesses via other devices. For example, the customer may subscribe to a specific service, e.g., an international calling service, via a first user endpoint device which is associated with a first service profile. However, the customer may not have access to the international calling service via a second user endpoint device which is associated with a second service profile. The customer may then use the sharing service to access the international calling service, by borrowing the service associated with the first user endpoint device while using the second user endpoint device.

In the description above, the actions of the borrower user endpoint device and the lender endpoint device are separately described. However, the illustrative description is not intended to limit a user endpoint device to being able to perform only the borrowing or the lending action. In fact, the user endpoint device is capable of performing the borrowing or the lending action. Furthermore, the sharing of services may be performed among any number of subscribers. As such, the number of users that may share services and/or join a sharing session is not limited.

Referring to FIG. 1, each customer may have an option to subscribe to the sharing service. For example, each customer may choose to subscribe to services that are used frequently, and choose to borrow services that are not used frequently from other customers. Customer A accesses wireless services via a user endpoint device 117. Customer B accesses wireless services via a user endpoint device 116. Customer C accesses wireless services via a user endpoint device 126. In one example, customer A may subscribe to a particular service while Customer B does not subscribe to the particular service to which customer A has subscribed to. However, customer B may wish to access the particular service to which customer A has subscribed via the sharing service. If customer A authorizes the borrowing of the particular service by customer B, the service provider may then enable customer B to borrow the particular service from customer A.

In one illustrative example, the user endpoint device 116 sends a request for the sharing service (i.e., a request for a sharing session) with the user endpoint device 117. The request comprises an Internet protocol address, an access point and/or other parameters of the user endpoint device 117. An MME 107 receives the request from the user endpoint device 116 via the eNodeB 111 located in the eUTRAN network 103.

The MME 107 forwards the request towards the HSS 109. The HSS performs an authentication of the user endpoint device 116. For example, the user may be requested to provide a password. The method of the present disclosure may authenticate via any well known form of authenticating the credentials of a user. If the user is successfully authenticated, the HSS 109 determines whether the user is a subscriber of the sharing service. The HSS 109 has access to the subscriber profile of the user endpoint device 116. The HSS 109 determines if the user endpoint device 116 is a subscriber of the sharing service by analyzing the subscriber profile. In one example, the subscriber profile may indicate that customer B does not subscribe to the sharing service. In another example, the subscriber profile may indicate that customer B is a subscriber of the sharing service. If the subscriber profile indicates that customer B is not a subscriber, an offer to subscribe to the sharing service may be sent to the user endpoint device 116. If either the user accepts the offer or is already a subscriber of the sharing service, the MME 107 proceeds to request an authorization from customer A.

In one embodiment, the HSS 109 also services customer A. The HSS 109 then obtains the subscriber profile of the user endpoint device 117. If user endpoint device 117 is not a subscriber of the sharing service, the request for the sharing service is denied. Otherwise, the MME 107 sends an authorization request to the intended lending user endpoint device. The MME 107 selects the SGW 108 associated with user endpoint device 117. The MME 107 then forwards the authorization request via the SGW that is selected. The SGW 108 forwards the request via eNodeB 112, which is located in the eUTRAN 104 and is serving the user endpoint device 117. In one embodiment, the authorization request comprises information pertaining to the identity of the user endpoint device 116. In one embodiment, the authorization request comprises a list of one or more services that are intended to be accessed by the user endpoint device 116. Upon receiving the authorization request, customer A may grant or deny the request from customer B. For example, the user endpoint device 117 receives the authorization request. Then, customer A may provide a response via the user endpoint device 117, wherein the response either grants or denies the request.

If the request by customer B is granted, the MME 107 interacts with the SGW 108 to setup the sharing session in accordance with the authorization. For example, if customer B is borrowing customer A's capability to place a call to customer C, customer B may now place a call to customer C. The SGW 108 processes the call request from customer B towards customer C. For example, the SGW 108 forwards the call request towards the user endpoint device 126 via the MSC 122 located in the GSM network 121. The MME 107 continues to track the sharing service and report to other network servers, as needed. For example, minutes used, services accessed, etc. may be reported to a billing server.

In one embodiment, the request for the sharing service is initiated by a calling party for a sharing session with a called party. For example, the sharing session may be initiated by customer B in order to share a display with customer A. For example, customers A and B may wish to share, a map, a set of directions, data, image, a financial transaction such that they are able to view the same content on their respective display screens. If the request by customer B is granted, the SGW 108 sets-up a sharing session between the user endpoint devices 116 and 117.

In one embodiment, the sharing service may be setup among any number of users. For example, the lender may authorize a plurality of users to borrow services simultaneously. The MME may then enable a plurality of users to engage in a shared session. For example, any number of users may join a sharing session, wherein each user is able to share a screen with other users in the session. The HSS performs authentication of each user and ensures that an authorization is provided by the lender for each user. In one embodiment, the lender may authorize the sharing by a group of users.

FIG. 1 also illustrates a scenario where a customer of an LTE network and a customer of a GSM network share services. For example, customer B wishes to borrow services from customer C. Customer B is served by the LTE network 101 and customer C is served by the GSM network 121. The SGW 108 serves customer B (the borrower). The MME in the LTE network and the MSC in the GSM network authenticate the sharing session via the HSS and HLR. The SGW 108 then communicates with an SGSN 130 of the GSM network 121 to setup the session. The SGSN of the lender (SGSN 130) communicates with a VLR to determine the current location of the user endpoint device to which the request is directed. If necessary, the VLR may also obtain an update from the home location register. The SGSN then directs the request to the home location register 123. In order to determine whether the request is directed to a subscriber of the sharing service, the home location register 123 obtains the subscriber profile of the user endpoint device to which the request is directed. In one example, the request may be directed to a user endpoint device that has no subscription to the sharing service. In another example, the request may be directed to a user endpoint device that has a subscription to the sharing service. If the user endpoint device 126 to is not a subscriber of the sharing service, the HLR 123 denies the request. Otherwise, the HLR 123 sends an authorization request to the user endpoint device 126. In one embodiment, the intended lender may have provided pre-authorization for borrowing of a service by a particular user, for a particular service, etc. If a pre-authorization exists, or an authorization is received, the HLR 123 may grant the borrower's request. The SGW 108 and SGSN 130 may then setup the sharing session. The HLR 123 keeps track of the borrowed services and provides reports as needed.

Figure 2:
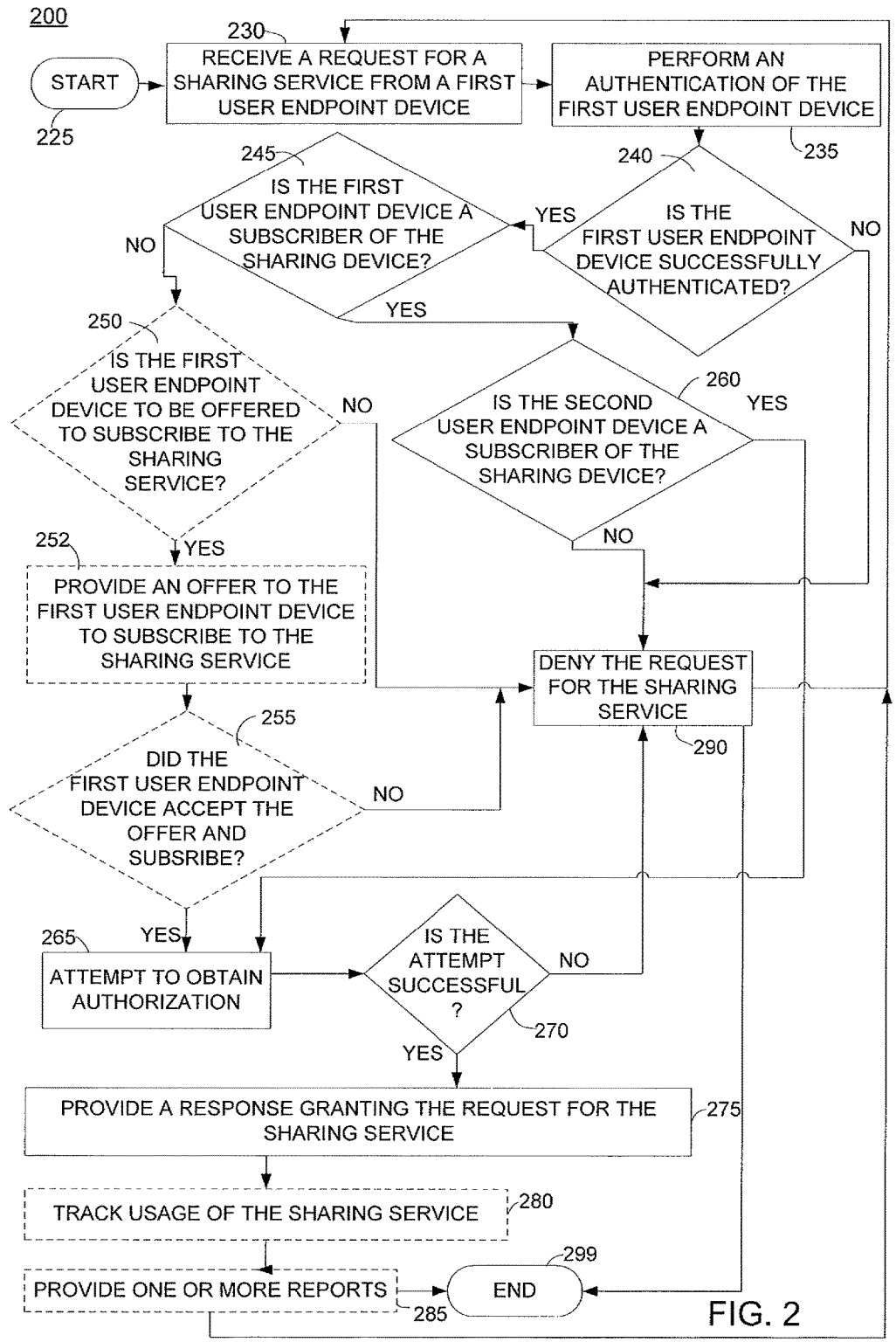
FIG. 2 illustrates a flowchart of a method for an MME supporting a sharing of a service in a wireless network.

FIG. 2 illustrates a flowchart of a method 200 for a Mobility Management Entity (MME) supporting a sharing of a service in a wireless network. For example, the method may be implemented in an MME deployed in network 105 as shown in FIG. 1 or the general purpose computer illustrated in FIG. 3 below. Method 200 starts in step 225 and proceeds to step 230.

In step 230, method 200 receives a request for a sharing service from a first user endpoint device associated with a first customer by a Mobility Management Entity (MME), wherein the request is directed to a second user endpoint device associated with a second customer. In one embodiment, the request may comprise an Internet protocol address, an access point and/or other parameters of a second user endpoint device associated with a second customer, with whom the first customer wishes to share a service.

In step 235, method 200 performs an authentication of the first user endpoint device. More specifically, the MME will interact with the HSS to authenticate the first customer. For example, the HSS may verify the password provided by the first customer and the like. In one embodiment, the HSS may authenticate a user endpoint device via any well known form of authenticating the credentials of a customer.

In step 240, method 200 determines if the first user endpoint device is successfully authenticated. For example, the HSS may determine whether the first customer provided a proper credential. If the first user endpoint device is successfully authenticated, the method proceeds to step 245. Otherwise, the method proceeds to step 290.

In step 245, method 200 determines whether the first user endpoint device is a subscriber of the sharing service. For example, the MME will interact with the HSS to determine if the first user endpoint device is associated with a subscriber of the sharing service by accessing and analyzing a subscriber profile of the first user endpoint device. In one example, the subscriber profile may indicate that the first user endpoint device is not a subscriber of the sharing service. In another example, the subscriber profile may indicate that the first user endpoint device is a subscriber of the sharing service. If the first user endpoint device is a subscriber of the sharing service (or broadly has a subscription with the sharing service), the method proceeds to step 260. Otherwise, the method proceeds to step 250. It should be noted that step 245 can be implemented as part of the authentication process of step 240.

In step 250, method 200 determines if the first user endpoint device is to be offered to subscribe to the sharing service. For example, the subscriber profile of the first user endpoint device may or may not allow the first user endpoint device to subscribe to the sharing service. In another example, the first user endpoint device may not be capable of handling the sharing session. If the first user endpoint device is to be offered to subscribe to the sharing service, the method proceeds to step 252. Otherwise, the method proceeds to step 290.

In optional step 252, method 200 provides an offer to the first user endpoint device to subscribe to the sharing service. For example, the MME may send an offer to which the first customer is able to either accept or reject by entering a reply via the first user endpoint device.

In optional step 255, method 200 determines if an acceptance is received from the first user endpoint device accepting the offer for subscribing to the sharing service. For example, the first customer may accept the offer and subscribe via the first user endpoint device. If the acceptance is received, the method proceeds to step 265. Otherwise, the method proceeds to step 290.

In step 260, method 200 determines if the second user endpoint device is also associated with a subscriber of the sharing service (or broadly has a subscription with the sharing service). In one embodiment, the MME will interact with the HSS, where the HSS will access and analyze a subscriber profile of the second user endpoint device to determine if the second user endpoint device is associated with a subscriber of the sharing service. In one embodiment, if the second user endpoint device is registered with another service provider, then the HSS may have to communicate with another server (e.g., another HSS belonging to the other service provider, etc.). In other words, another HSS may be responsible for the second user endpoint device. If the second user endpoint device is associated with a subscriber of the sharing service, the method proceeds to step 265. Otherwise, the method proceeds to step 290.

In step 265, method 200 may attempt to obtain an authorization from the second customer to enable the first user endpoint device to access a service to which the second customer has subscribed to.

In one embodiment, the authorization may already have been provided by the second customer. For example, the second customer may have pre-authorized particular users, groups of users, peers, etc. to access one or more services. If the authorization is already provided by the second customer, the attempt to obtain the authorization is performed by accessing the service profile associate with the second user endpoint device and analyzing the content in order to determine if the request can be granted for the specific requesting user endpoint device and/or for a specific service that is being requested.

In another embodiment, the attempt to obtain the authorization is performed by sending an authorization request to the second user endpoint device for a specific sharing session. In one embodiment, the MME sends the authorization request to the second user endpoint device. For example, the MME may identify the serving gateway associated with the second user endpoint device and forward the authorization request towards the second user endpoint device via the serving gateway that is associated with the second user endpoint device. The serving gateway routes the authorization request to the second user endpoint device. Upon receiving the authorization request, the second customer may grant or deny the authorization request. For example, the second customer may provide a response via the second user endpoint device, wherein the response either grants or denies the authorization request. The serving gateway associated with the second user endpoint device will then forward the response to the MME.

In one embodiment, the authorization request may comprise information pertaining to the identity of the first user endpoint device. In one embodiment, the authorization request comprises a list of one or more services that are intended to be accessed by the first user endpoint device. In general, the authorization request may comprise any information that will allow the second customer to make an informed decision as to whether the authorization request will be granted.

In step 270, method 200 determines if the attempt to obtain the authorization is successful. For example, the method may determine that a pre-authorization exists or may receive a response from the second user endpoint device granting the authorization request. If the authorization is successfully obtained, the method proceeds to step 275. Otherwise, the method proceeds to step 290.

In step 275, method 200 provides a response granting the request for the sharing service. For example, the MME may forward a response to the serving gateway associated with the first user endpoint device to inform the first customer that the request has been granted. The serving gateway may then setup the sharing session, in accordance with the authorization. For example, the first user endpoint device may be authorized to access one or more services to which the second customer has subscribed to. For example, the first user endpoint device may not have subscribed to a VoIP service, while the second user endpoint device may have subscribed to a VoIP service. The sharing session may now enable the first user endpoint device to initiate a VoIP call session with a third user endpoint device.

In optional step 280, method 200 tracks usage of the sharing service. For example, the method may track minutes used, services accessed, etc, e.g., via a billing server.

In optional step 285, method 200 provides one or more reports. For example, the MME or the serving gateway may provide a report of usage to a billing server. The method then proceeds to either step 299 to end processing the current request or returns to step 230 to receive another request.

In step 290, method 200 denies the request for the sharing service. For example, the MME provides a response to the first customer denying the request. The method then proceeds to either step 299 to end processing the current request or returns to step 230 to receive another request.

Figure 3:
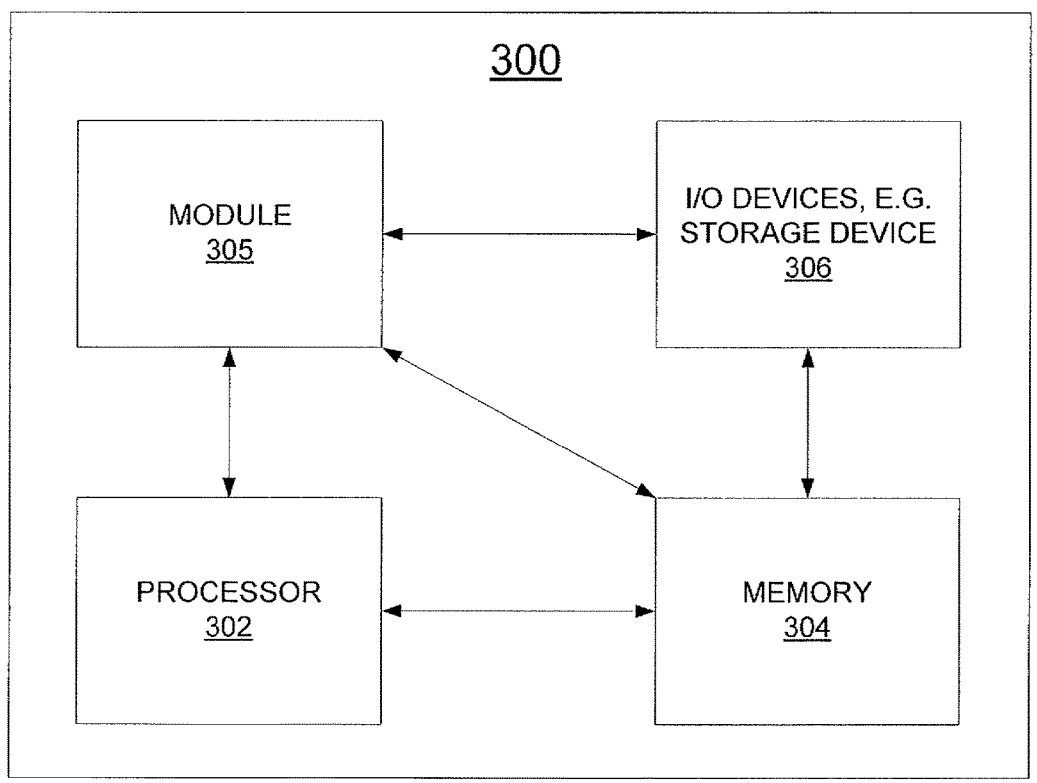
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a hardware processor element 302 (e.g., a CPU), a memory 304, e.g., random access memory (RAM) and/or read only memory (ROM), a module 305 for sharing a service, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, a computer-readable medium may be in communication with the processor, where the computer-readable medium having stored thereon a plurality of instructions, the plurality of instructions including instructions which, when executed by the hardware processor, cause the hardware processor to perform the method (e.g., method 200) as disclosed above.

In one embodiment, the present module or process 305 for sharing a service can be loaded into memory 304 and executed by processor 302 to implement the functions as discussed above. As such, the present method 305 for sharing a service (including associated data structures) of the present disclosure can be stored on a non-transitory (e.g., tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for sharing a service in a wireless network, the method comprising:
receiving, by a processor, a request via the wireless network for sharing the service from a first user endpoint device associated with a first customer, wherein the request is directed to a second user endpoint device having an internet protocol address associated with a second customer, the service is associated with the second user endpoint device in which the first user endpoint device does not have authorization to access;
performing, by the processor, an authentication of the first user endpoint device;
determining, by the processor, whether the first user endpoint device has a subscription to a sharing service for sharing the service, when the first user endpoint device is successfully authenticated;

determining, by the processor, whether the second user endpoint device has a subscription to the sharing service;

obtaining, by the processor, an authorization to enable the first user endpoint device to access the service that is associated with the second user endpoint device, when both the first user endpoint device and the second user endpoint device have a subscription to the sharing service, wherein the service is related to a financial transaction privilege for performing a financial transaction associated with a bank account to make a purchase;

providing, by the processor, over a wireless communication channel a response granting the request for the sharing of the service; and setting up, by the processor, a sharing session over the wireless network for the first user endpoint device to initiate the financial transaction, wherein the sharing session simultaneously displays financial transaction data of the financial transaction to the first user endpoint device and the second user endpoint device.

2. The method of claim 1, further comprising:
providing dynamically an offer to the first user endpoint device to subscribe to the sharing service, when the first user endpoint device does not have a subscription to the sharing service.

3. The method of claim 1, wherein the obtaining the authorization is performed by sending an authorization request to the second user endpoint device.

4. The method of claim 1, wherein the obtaining the authorization is performed by communicating with another server of another wireless network, wherein the another server determines whether the second user endpoint device has a subscription to the sharing service.

5. The method of claim 1, wherein the obtaining the authorization is performed by analyzing a service profile associated with the second user endpoint device.

6. The method of claim 5, wherein the analyzing the service profile of the second user endpoint device determines whether the request for the sharing service is to be granted to the first user endpoint device.

7. The method of claim 6, wherein the analyzing the service profile associated with the second user endpoint device determines whether the request for the sharing service is to be granted for the service.

8. The method of claim 1, wherein the request for the sharing service comprises a parameter of the second user endpoint device.

9. The method of claim 8, wherein the parameter of the second user endpoint device comprises an Internet protocol address of the second user endpoint device.

10. The method of claim 8, wherein the parameter of the second user endpoint device comprises an access point of the second user endpoint device.

11. The method of claim 1, wherein a sharing of the service is selectively turned-on or turned-off by the second customer of the second user endpoint device.

12. The method of claim 11, wherein second customer is able to indicate whether the service is available via the sharing service.

13. The method of claim 1, further comprising:
tracking a usage of the service that is shared.

14. The method of claim 13, further comprising:
charging a fee based on the usage to the first customer.

15. The method of claim 13, further comprising:
charging a fee based on the usage to the second customer.

16. The method of claim 1, wherein the setting up the sharing session comprises:
establishing a communication session between the first user endpoint device and second first user endpoint device.

17. The method of claim 1, wherein the sharing service enables the second customer to transfer a financial transaction privilege of the second customer to the first customer.

18. A non-transitory computer-readable medium storing a plurality of instructions which, when executed by a processor, cause the processor to perform operations for sharing a service in a wireless network, the operations comprising:

receiving a request via the wireless network for sharing the service from a first user endpoint device associated with a first customer, wherein the request is directed to a second user endpoint device having an internet protocol address associated with a second customer, the service is associated with the second user endpoint device in which the first user endpoint device does not have authorization to access;

performing an authentication of the first user endpoint device;

determining whether the first user endpoint device has a subscription to a sharing service for sharing the service, when the first user endpoint device is successfully authenticated;

determining whether the second user endpoint device has a subscription to the sharing service;

obtaining an authorization to enable the first user endpoint device to access the service that is associated with the second user endpoint device, when both the first user endpoint device and the second user endpoint device have a subscription to the sharing service, wherein the service is related to a financial transaction privilege for performing a financial transaction associated with a bank account to make a purchase;

providing over the wireless communication channel a response granting the request for the sharing of the service; and setting up a sharing session over the wireless network for the first user endpoint device to initiate the financial transaction, wherein the sharing session simultaneously displays financial transaction data of the financial transaction to the first user endpoint device and the second user endpoint device.

19. An apparatus for sharing a service in a wireless network, the apparatus comprising:
a processor; and
a computer-readable medium storing a plurality of instructions which, when executed by the processor, cause the processor to perform operations, the operations comprising:

receiving a request via the wireless network for sharing the service from a first user endpoint device associated with a first customer, wherein the request is directed to a second user endpoint device having an internet protocol address associated with a second customer, the service is associated with the second user endpoint device in which the first user endpoint device does not have authorization to access;

performing an authentication of the first user endpoint device;

determining whether the first user endpoint device has a subscription to a sharing service for sharing the service, when the first user endpoint device is successfully authenticated;

determining whether the second user endpoint device has a subscription to the sharing service;

obtaining an authorization to enable the first user endpoint device to access the service that is associated with the second user endpoint device, when both the first user endpoint device and the second user endpoint device have a subscription to the sharing service, wherein the service is related to a financial transaction privilege for performing a financial transaction associated with a bank account to make a purchase;

providing over the wireless communication channel a response granting the request for the sharing of the service; and setting up a sharing session over the wireless network for the first user endpoint device to initiate the financial transaction, wherein the sharing session simultaneously displays financial transaction data of the financial transaction to the first user endpoint device and the second user endpoint device.

20. The non-transitory computer-readable medium of claim 18, wherein the obtaining the authorization is performed by sending an authorization request to the second user endpoint device.

* * * * *